UNITED STATES PATENT OFFICE.

FRANK AHLBURG, OF FAIRBANKS, TERRITORY OF ALASKA.

PROCESS OF MARKING FRUIT.

1,151,506. Specification of Letters Patent. Patented Aug. 24, 1915.

No Drawing. Application filed October 5, 1914. Serial No. 865,040.

*To all whom it may concern:*

Be it known that I, FRANK AHLBURG, a subject of the Emperor of Germany, and a resident of Fairbanks, Territory of Alaska, have invented a certain new and useful Process of Marking Fruit, of which the following is a specification.

The invention relates to a process of marking or branding fruit.

An object of the invention is to provide a method of marking the skin of fruit in such manner that the marking will not in any way affect the keeping quality of the fruit.

The process relates particularly to the marking of fruit, such as apples, which has a natural wax coating on the skin.

At the present time there is no method that the fruit grower can employ for directly marking a brand or trade mark on his fruit to distinguish it from other fruit, so that he may establish a reputation with the public for the particular fruit which he raises. The system of wrapping the individual pieces of fruit in printed tissue paper has been employed, but this method is expensive and there is no guarantee to the grower that the wrapping will not be removed and others substituted before the fruit reaches the consumer. Growers of particularly high grade fruit have felt the need for some time of a means of distinguishing their fruit from the fruits of others so that they might reap the benefits of the choiceness of their crop. The marking or branding of fruit would also permit the consumer to demand and recognize the desired fruit.

The process of my invention contemplates marking directly on the fruit, in such manner that the fruit is in no manner injured. Fruits, such as apples, have a wax coating on their skins which renders the fruit impervious to moisture and air, thereby permitting the fruit to remain in good condition for long periods of time. If this coating is removed or destroyed or punctured, the apple quickly rots.

In accordance with my invention, I melt a portion of the wax coating and heat the skin below it without removing the wax or breaking its surface. The application of heat to the skin, produces, after a lapse of time, a discoloration of the skin at the point of heat application, but produces no injurious effect upon the apple.

In practice, I provide a die or other metallic body having on its surface the mark which is to be placed on the fruit. This die or metallic body is maintained at a temperature above the melting point of the wax, by any suitable means, such as an electric current passing through resistance wires arranged in thermal communication with the die. When an electric current is employed means are preferably provided for controlling the current, so that the temperature of the die remains substantially constant. The temperature of the die is such that it rapidly melts the wax and heats the skin, but not high enough to burn the wax or the skin. By experiment I have found that good results are obtained with the die at a temperature between 155° and 165° Fahrenheit. When the die is heated the apple is pressed against it for an instant and removed. The heat causes the wax to become fluid so that when the apple is removed from the die, the wax flows back or remains in its original position and solidifies, entirely sealing the skin against air. The effect of the heat on the skin is to produce a discoloration thereof at those points where the skin contacted with the die, thereby producing the desired mark or brand. The discoloration does not appear until some time after the apple has been branded. On a green apple the brand appears white and on a red apple it appears green. The brand is, of course, visible through the wax coating.

Various devices may be employed for maintaining the die at the desired temperature, but since any suitable form of device may be employed and since the device does not enter into the present invention, I shall not describe the device which I have constructed for the purpose of carrying out the method.

I claim:

1. The method of marking fruit having a natural wax coating on its skin which consists in bringing the fruit momentarily into contact with a body having a temperature above the melting point of the wax.

2. The method of marking fruit having a natural wax coating on its skin which consists in bringing the fruit momentarily into contact with a die the temperature of which is above the melting point of the wax and below the burning point of the wax.

3. The method of marking fruit having a natural wax coating on its skin which consists in melting the wax covering a portion of the skin without removing said wax and heating portions of the skin below the melted wax.

4. The process of marking fruit having a natural wax coating on its skin which consists in bringing the fruit into contact with a hot metallic die for a short period of time, whereby the wax is melted and a mark corresponding to the mark on the die is produced on the skin of the fruit.

In testimony whereof, I have hereunto set my hand at Portland, Oregon, this 29th day of September 1914.

FRANK AHLBURG.

In presence of—
 B. F. GREEN,
 TRAFTON M. DYE.